US011733393B2

(12) United States Patent
Ribot et al.

(10) Patent No.: US 11,733,393 B2
(45) Date of Patent: Aug. 22, 2023

(54) BIT TRANSITION ENHANCED DIRECT POSITION ESTIMATION IN GLOBAL SATELLITE SYSTEM POSITIONING

(71) Applicant: Albora Technologies Limited, Ilford (GB)

(72) Inventors: Miquel Ribot, Barcelona (ES); Adrià Gusi, Barcelona (ES); Pau Closas, London (GB)

(73) Assignee: Albora Technologies Limited, London (GB)

( * ) Notice: Subject to any disclaimer, the term of this patent is extended or adjusted under 35 U.S.C. 154(b) by 252 days.

(21) Appl. No.: 17/167,936

(22) Filed: Feb. 4, 2021

(65) Prior Publication Data

US 2022/0244404 A1    Aug. 4, 2022

(51) Int. Cl.
  *G01S 19/30* (2010.01)
  *G01S 19/24* (2010.01)
  *G01S 19/52* (2010.01)
  *G01S 19/44* (2010.01)
  *G01S 19/35* (2010.01)

(52) U.S. Cl.
  CPC ............ *G01S 19/30* (2013.01); *G01S 19/243* (2013.01); *G01S 19/35* (2013.01); *G01S 19/44* (2013.01); *G01S 19/52* (2013.01)

(58) Field of Classification Search
  CPC ........ G01S 19/30; G01S 19/243; G01S 19/35; G01S 19/44; G01S 19/52
  See application file for complete search history.

(56) References Cited

U.S. PATENT DOCUMENTS

| | | | |
|---|---|---|---|
| 9,341,719 B2 * | 5/2016 | Jarvis | G01S 19/24 |
| 2016/0161614 A1 * | 6/2016 | Lukcin | G01S 19/30 |
| | | | 342/357.27 |

OTHER PUBLICATIONS

GNSS Receivers _ Galileo.pdf from https://web.archive.org/web/20181004130628/http://galileognss.eu/gnss-receivers/ (Year: 2018).*
GNSS Receivers Technology and Product Explanation _ TerrisGPS.pdf from https://web.archive.org/web/20191204070504/http://www.terrisgps.com/product-category/unicore/ (Year: 2019).*

* cited by examiner

*Primary Examiner* — Bernarr E Gregory
*Assistant Examiner* — Yonghong Li
(74) *Attorney, Agent, or Firm* — CRGO Global; Steven M. Greenberg

(57) ABSTRACT

Embodiments of the present invention provide a method, system and computer program product for bit transition enhanced direct position estimation (DPE) from global navigation satellite system (GNSS) signals and includes the reception in a GNSS receiver of signals from multiple, different satellites in multiple satellite constellations adapted for use with the GNSS. The method estimates the GNSS receiver parameters position, velocity, clock bias, clock drift, and optionally and if unknown, the receiver time. The method generates a model of the received GNSS signals that depends on the receiver parameters. Uniquely, the method includes the synchronization of both a primary code and also a secondary code in the received GNSS signal model, in addition to time delays, Doppler shifts, and other relevant parameters for positioning. Finally, if the secondary code of a particular signal is unknown, the method determines the combination of bit transitions that maximizes the optimization problem.

9 Claims, 2 Drawing Sheets

BIT TRANSITION ENHANCED DIRECT POSITION ESTIMATION IN GLOBAL SATELLITE SYSTEM POSITIONING

BACKGROUND OF THE INVENTION

Field of the Invention

The present invention relates to the field of global navigation satellite system (GNSS) position determination in satellite-based global positioning systems.

Description of the Related Art

Satellite-based positioning refers to the position, velocity and time (PVT) determination for a GNSS receiver according to GNSS positioning data within signals such as those produced by the global positioning system (GPS), Global Navigation Satellite System (GLONASS), Galileo, NavIC and BeiDou. The core signal for GNSS is a direct-sequence spread-spectrum signal, synchronously transmitted by each satellite in a GNSS satellite constellation. The spread-spectrum signal includes both a ranging code, also referred to as the pseudorandom noise (PRN) spreading sequence, and also a low-rate data-link which broadcasts ephemeris information for the corresponding satellite.

Each GNSS receiver receives the GNSS signal from which the GNSS receiver estimates PVT. To do so, programmatic logic executing in coordination with the GNSS receiver estimates the ranging code in the signal model so as to construct a set of observables for each satellite from which the GNSS signal had been received. The observables in the set includes a series of ranges computed from the time delay of the receipt of the corresponding GNSS signal, referred to as pseudoranges, and also phase-difference estimates, referred to as carrier-phase measurements, between the different GNSS signals. With the observables, computing PVT is a matter of solving for a multilateration of the observables within a least squares algorithm.

Traditionally, the computation of PVT is a two-step process. The first step of the process produces a coarse estimate of synchronization parameters based upon the unpolished received signal data. Additionally, this first step might involve a refinement of the coarse estimate utilizing either finer acquisition or tracking loops. More precisely, in the first step, estimates of time delay and Doppler shifts are determined from the spread spectrum signals received from a selection of the satellites. In the second step, referred to as the "navigation solution", the GNSS observables are processed in order to estimate PVT of the GNSS receiver.

Notably, modern GNSS signals include a secondary PRN code in supplement to the primary PRN code. The primary code is a binary code repeating continuously with a high chipping rate, while the secondary code is also a binary code repeating continuously, but it has a much lower chipping rate by orders of magnitude relative to the chipping rate of the primary code. Each chip of the secondary code multiplies one period of the primary code. The product of the primary and secondary codes is then usually called the tiered code. Although a secondary code brings several advantages and allows a significant improvement of the performance of a GNSS receiver, the presence of the secondary code complicates the acquisition step because the correct alignment of the secondary PRN code for extended signal acquisition times requires additional processing resources at the GNSS receiver.

Recent advances in computational processing power, however, obviate the need for the two-step process determination of PVT and instead, permit a single-step, direct positioning estimation (DPE) from the received spread spectrum signals. In DPE, the program instructions operating within the GNSS receiver integrate code/carrier tracking loops and the navigation solution into a single step. Importantly, GNSS receivers implementing DPE enhance acquisition and tracking of satellites and deliver PVT under challenging scenarios such as multipath propagation or weak signal and fading conditions. Contrary to the two-step process of traditional position estimation, DPE can both use and extract useful information from weak GNSS signals while coping with signal blockages. As such, DPE can achieve positioning despite poor satellite coverage at the location of the GNSS receiver.

BRIEF SUMMARY OF THE INVENTION

Embodiments of the present invention address deficiencies of the art in respect to the joint processing of primary and secondary codes in a two-step position estimation process, while incorporating the advantages of DPE in order to provide a novel and non-obvious method, system and computer program product for bit transition enhanced DPE of a GNSS signal. In an embodiment of the invention, a method for bit transition enhanced DPE of a GNSS receiver includes the reception in a GNSS receiver of signals from multiple, different satellites in a satellite constellation adapted for use with the GNSS. The method additionally includes the synchronization of both a primary code and also a secondary code from the received GNSS signal. Uniquely, the method further includes the identification of a multiplicity of bit transitions in each of the primary and secondary codes and a determination of an alignment of one of the bit transitions of each of the primary and secondary codes. Finally, the method includes a modification of a determined coarse position for the primary code using the determined alignment of the bit transition.

In one aspect of the embodiment, the determination of the alignment includes generating an augmented cross-ambiguity function for each signal local code. To that end, the set of augmented cross-ambiguity function matrices corresponds to a number of the satellites in view of the GNSS receiver. As well, each of the cross-ambiguity function matrices may then be processed by DPE utilizing the determined alignment of the bit transitions. Consequently, each of the cross-ambiguity function matrices are processed by DPE accounting not only for position, velocity and time, but also secondary code alignment or potential bit transitions.

In another embodiment of the invention, a data processing system is adapted for bit transition enhanced DPE of a GNSS signal. The system includes a host computing platform having one or more computers, each with memory and at least one processor. The system also includes a GNSS receiver coupled to the host computing platform. Finally, the system includes a DPE module that includes computer program instructions. The instructions are enabled while executing in the host computing platform to receive in the GNSS receiver positioning signals from a multiplicity of different satellites in a satellite constellation adapted for use with the GNSS, to extract from the signals both a primary code and also a secondary code, to identify a multiplicity of bit transitions in each of the primary and secondary codes, to determine an alignment of one of the bit transitions of each of the primary and secondary codes and to modify a coarse position determined for the primary code with the determined alignment of the one of the bit transitions.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for bit transition enhanced DPE of a GNSS signal. In accordance with an embodiment of the invention, both primary and secondary codes are extracted from a GNSS signal and an alignment of bit transitions determined between the bit transitions of the primary code and the bit transitions of the secondary code. The DPE function then may be computed not only in consideration of time, position and velocity, but also the alignment of bit transitions determined for the primary and secondary codes. In this way, the enhanced precision afforded by the consideration of the bit alignment of the secondary code with the primary code can be achieved in DPE for the GNSS signal.

Figure 1:
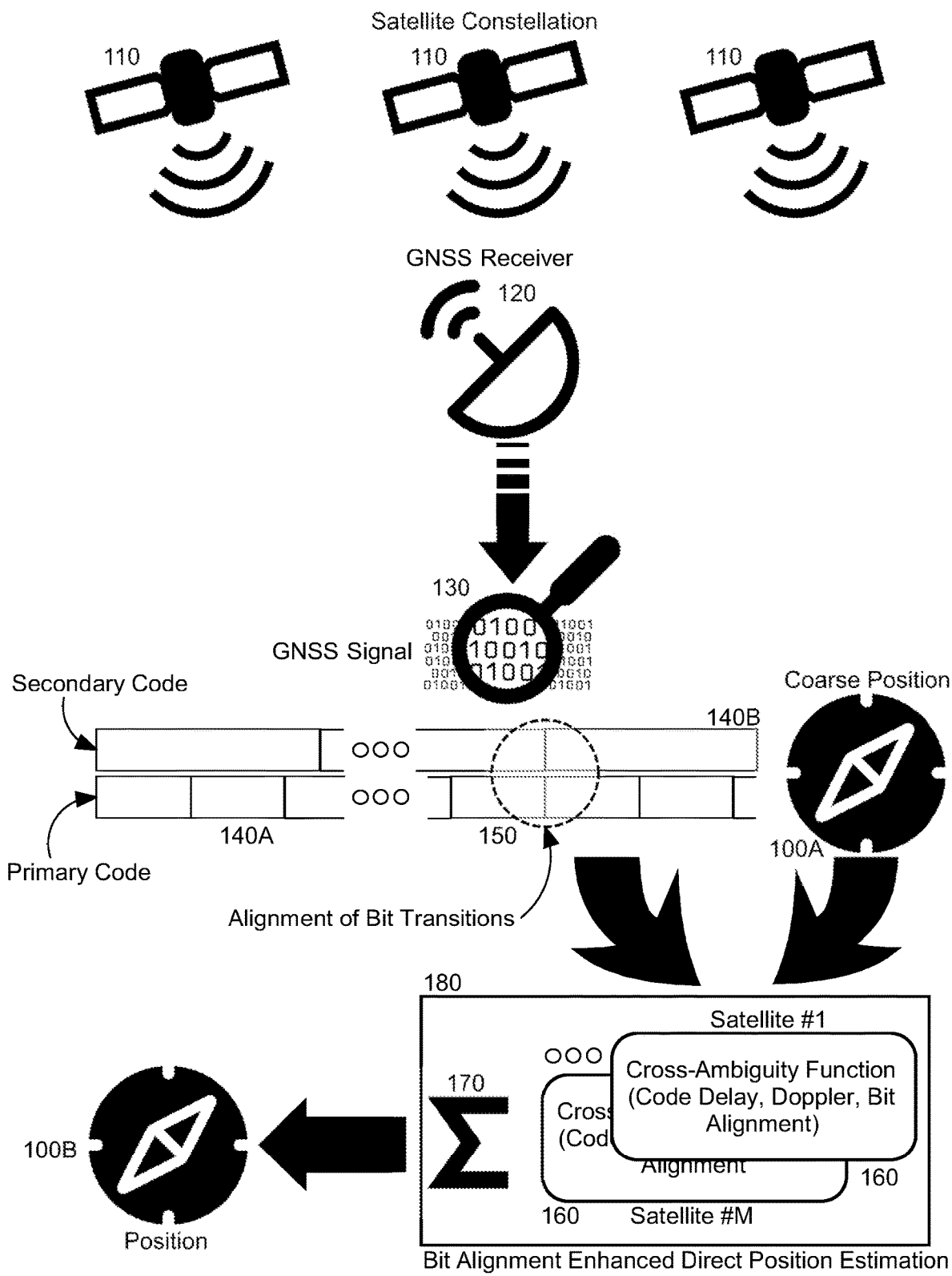
FIG. 1 is pictorial illustration of a process for bit transition enhanced DPE of a GNSS signal.

In further illustration, FIG. 1 pictorially shows a process for bit transition enhanced DPE of a GNSS signal. As shown in FIG. 1, a GNSS signal 130 is received in a GNSS receiver 120 from one of several different satellites 110 in a GNSS satellite constellation. Both a primary code 140A and a secondary code 140B are extracted from the GNSS signal 130 and an alignment of bit transitions 150 detected in so far as the bit transitions for the secondary code 140B presents at a frequency which is orders of magnitude greater than that of the primary code 140A. As well, a coarse position 100A is determined based upon an amalgamation of the primary code 140A and a local code (not shown) generated within the GNSS receiver 120.

Thereafter, a cross-ambiguity function (CAF) 160 for the one of the several different satellites 110 is determined based upon the coarse position 100A in combination with the determined alignment 150. The process then repeats for an additional GNSS signal 130 for a different one of the satellites 110 of the constellation. When a sufficient number of CAF 160 have been computed for the different satellites 110, a sum 170 can be computed of the CAF 160 for each of the satellites and subjected to DPE so as to produce a bit alignment enhanced DPE 180. The result of the bit alignment enhanced DPE 180 is a position estimate 100B for the GNSS receiver 120.

Figure 2:
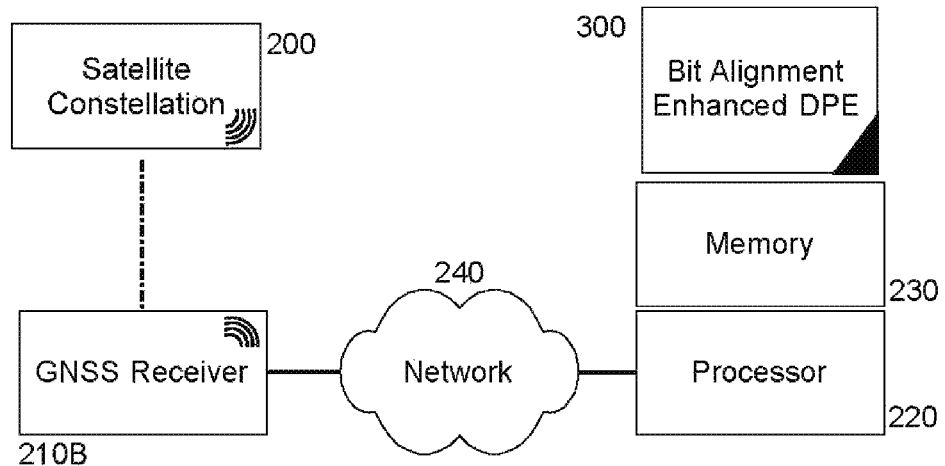
FIG. 2 is a schematic diagram illustrating a host data processing system adapted for bit transition enhanced DPE of a GNSS signal; and, FIG. 3 is a flow chart illustrating a process for bit transition enhanced DPE of a GNSS signal.

The process described in connection with FIG. 1 can be implemented within a data processing system adapted to estimate position information in a GNSS. In further illustration, FIG. 2 schematically shows a host data processing system adapted for bit transition enhanced DPE of a GNSS signal. The system includes a host computing system that includes memory 230 and at least one processor 220. The host computing system is communicatively coupled over computer communications network 240 to a GNSS receiver 210, albeit in some aspects of the embodiment, the host computing system can be included as part of the GNSS receiver 210.

The GNSS receiver 210 receives GNSS signals from satellites in GNSS satellite constellation 200 and processes the GNSS signals in accordance with a bit alignment enhanced DPE as performed by DPE module 300. In this regard, DPE module 300 includes computer program instructions that when executed in the memory 230 by the processor(s) 220, are operable to locate a common bit transition between the primary and secondary codes of a GNSS signal received in the GNSS receiver 210 from a specific satellite in the satellite constellation 200, to pre-process the primary code with a local code generated in the GNSS receiver 210 to produce a coarse position of the GNSS receiver 210 and then to compute a CAF for the GNSS signal accounting for the common bit transition. The program instructions further are enabled to sum the computed CAF for each GNSS signal received from different satellites in the constellation 200 and to submit the sum to DPE in order to produce a fine position estimate for the GNSS receiver 210.

Figure 3:
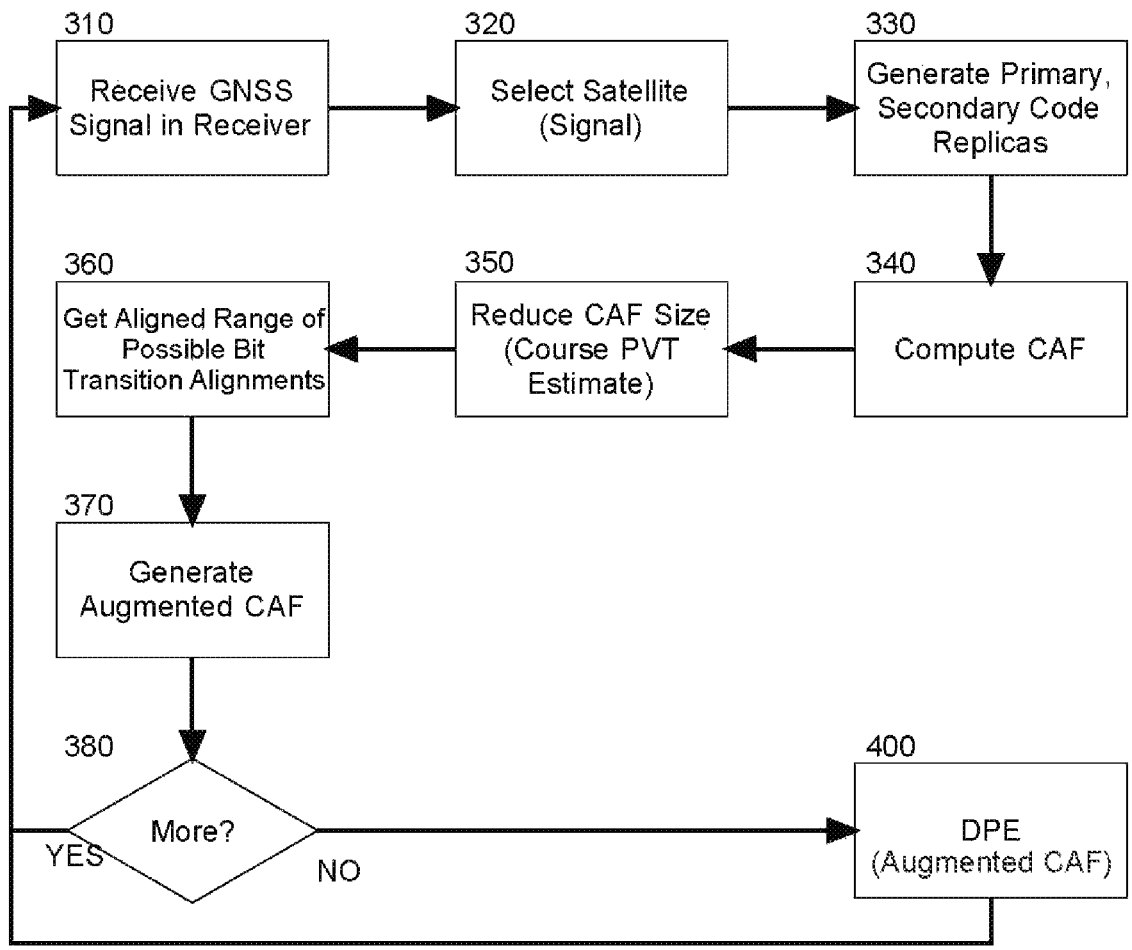

In even yet further illustration of the operation of the DPE module 300, FIG. 3 is a flow chart illustrating a process for bit transition enhanced DPE of a GNSS signal. Beginning in block 310, a GNSS signal is received in the GNSS receiver from a specific satellite in the constellation and in block 320, the specific satellite signal is selected. Then, in block 330, both a primary and a secondary local code replicas are generated and the CAF for that specific satellite signal is computed in block 340. In block 350, the receiver's position, velocity and time initial coarse estimate is used to reduce the size of the computed CAF matrix by selecting only the relevant region.

Importantly, in block 360, a range of possible bit transition alignments between the primary code and secondary code can be identified, for example, by testing different alignment hypothesis for each of the codes and selecting the greatest correlating hypothesis in order to align the codes. Then, in block 370, an augmented CAF can be generated for the range of identified bit transition alignments as between the primary code and the secondary code. In this regard, the augmented CAF enjoys three dimensions of structure—time delay, doppler shift values and bit transitions. As such, the bit transitions of the augmented CAF are conserved for subsequent use during position estimation. Then, in decision block 380 if further GNSS signals from different satellites in the constellation are received, the process returns to block 310. But, in decision block 380, when no further GNSS signals are necessary to be received in order to compute a fine position of the GNSS receiver, in block 400 DPE in order to produce a fine position estimate for the GNSS receiver. Specifically, in block 400, the optimized CAF output for each satellite is combined including the bit alignments in order to produce a loss function or cost function which function then is optimized for position and velocity to produce the position estimate.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A method for bit transition enhanced direct position estimation (DPE) of global navigation satellite system (GNSS) signals, the method comprising:
  receiving in a GNSS receiver GNSS signals from a multiplicity of different satellites in a satellite constellation adapted for use with the GNSS;
  extracting from each of the signals both a primary code and also a secondary code;
  identifying a multiplicity of bit transitions in each of the primary and secondary codes;
  determining an alignment of one of the bit transitions of each of the primary and secondary codes by generating a set of augmented cross-ambiguity functions for each of the signals in correlation with a local code of the GNSS receiver and processing each of the augmented cross-ambiguity functions by direct position estimation (DPE) of the augmented cross-ambiguity functions utilizing the one of the bit transitions determined to be in the alignment; and,
  modifying a coarse position determined for the primary code with the determined alignment of the one of the bit transitions.

2. The method of claim 1, wherein each of the cross-ambiguity functions are processed by DPE accounting not only for position, velocity and time, but also to determine the bit transitions such that extended integration times are enabled.

3. The method of claim 1, wherein the set of augmented cross-ambiguity functions corresponds to a number of the different satellites which are in view of the GNSS receiver.

4. A data processing system adapted for bit transition enhanced direct position estimation (DPE) of global navigation satellite system (GNSS) signals, the system comprising:
 a host computing platform comprising one or more computers, each comprising memory and at least one processor; and,
 a DPE module comprising computer program instructions enabled while executing in the host computing platform to perform:
 receiving in a GNSS receiver GNSS signals from a multiplicity of different satellites in a satellite constellation adapted for use with the GNSS;
 extracting from each of the signals both a primary code and also a secondary code;
 identifying a multiplicity of bit transitions in each of the primary and secondary codes;
 determining an alignment of one of the bit transitions of each of the primary and secondary codes by generating a set of augmented cross-ambiguity functions for each of the signals in correlation with a local code of the GNSS receiver and processing each of the augmented cross-ambiguity functions by direct position estimation (DPE) of the augmented cross-ambiguity functions utilizing the one of the bit transitions determined to be in the alignment; and,
 modifying a coarse position determined for the primary code with the determined alignment of the one of the bit transitions.

5. The system of claim 4, wherein each of the cross-ambiguity functions are processed by DPE accounting not only for position, velocity and time, but also the one of the bit transitions.

6. The system of claim 4, wherein the set of augmented cross-ambiguity functions corresponds to a number of the different satellites which are in view of the GNSS receiver.

7. A computer program product for bit transition enhanced direct position estimation (DPE) of global navigation satellite system (GNSS) signals, the computer program product including a non-transitory computer readable storage medium having program instructions embodied therewith, the program instructions executable by a device to cause the device to perform a method including:
 receiving in a GNSS receiver GNSS signals from a multiplicity of different satellites in a satellite constellation adapted for use with the GNSS;
 extracting from each of the signals both a primary code and also a secondary code;
 identifying a multiplicity of bit transitions in each of the primary and secondary codes;
 determining an alignment of one of the bit transitions of each of the primary and secondary codes by generating a set of augmented cross-ambiguity functions for each of the signals in correlation with a local code of the GNSS receiver and processing each of the augmented cross-ambiguity functions by direct position estimation (DPE) of the augmented cross-ambiguity functions utilizing the one of the bit transitions determined to be in the alignment; and,
 modifying a coarse position determined for the primary code with the determined alignment of the one of the bit transitions.

8. The computer program product of claim 7, wherein each of the cross-ambiguity functions are processed by DPE accounting not only for position, velocity and time, but also the one of the bit transitions.

9. The computer program product of claim 7, wherein the set of augmented cross-ambiguity functions corresponds to a number of the different satellites which are in view of the GNSS receiver.

\* \* \* \* \*